United States Patent [19]
Daniell
[11] 3,740,497
[45] June 19, 1973

[54] ARTIFICIAL LINE BRIDGE SUBSCRIBER DIAL LONG LINE EQUIPMENT TESTER

[76] Inventor: Gerald Wallace Daniell, P. O. Box 984, 315 W. McLendon Circle, La Grange, Ga. 30240

[22] Filed: June 29, 1971
[21] Appl. No.: 158,010

[52] U.S. Cl. .................... 179/175.3, 179/175.31 R
[51] Int. Cl. .................... H04b 3/46
[58] Field of Search .................... 179/175, 175.1 R, 179/175.3, 175.2 B, 17 E, 175.31 R

[56] References Cited
UNITED STATES PATENTS

| | | | |
|---|---|---|---|
| 1,442,455 | 1/1923 | Whiting | 179/175.1 R |
| 2,802,902 | 8/1957 | Elliott et al. | 179/17 E |
| 1,479,051 | 1/1924 | Best | 179/175.1 R |
| 1,472,507 | 10/1923 | Vennes | 179/175.3 |
| 2,875,279 | 2/1959 | Dunlap | 179/17 E |

*Primary Examiner*—William C. Cooper
*Assistant Examiner*—Douglas W. Olms
*Attorney*—Edward S. Irons, Mary Helen Sears, Harry John Staas, et al.

[57] ABSTRACT

A unitary circuit for testing dial long line equipment in a telephone subscriber system having a central office. A resistance bridge operative to provide an equally divided predetermined resistance to balance tip and ring in the telephone system is used to simulate the operation of a cable pair in a long line. Switch means selectively connect the resistance bridge to the dial long line equipment under test, and dialing means are utilized for dialing into or out of the testing circuit to interpose said predetermined resistance between a subscriber connected to the dial long line equipment under test and the central office to determine if the dial long line equipment under test is in acceptable operating condition to service the subscriber.

4 Claims, 3 Drawing Figures

INVENTOR
GERALD WALLACE DANIELL

BY Irons, Sears, Staas,
Halsey & Santorelli
ATTORNEYS

ARTIFICIAL LINE BRIDGE SUBSCRIBER DIAL LONG LINE EQUIPMENT TESTER

BACKGROUND OF THE INVENTION

1. Field of the Invention

The invention relates to an artificial line bridge unit for testing sub-scriber dial long line equipment and has particular utility for use in telephone systems.

2. Description of the Prior Art

The prior art discloses the use of artificial lines to simulate actual resistive characteristics of equipment used in dial long line subscriber systems. Thus, Whiting U.S. Pat. No. 1,422,455 relates to a telephone circuit for testing the transmission of electrical apparatus wherein the repeater circuit to be tested includes an artificial line having an impedance which may be adjusted to a value corresponding to the impedance of the line with which the repeater is to be used. The prior art also teaches the use of a line bridge for use in telephone circuits (note Bennett et al. U.S. Pat. No. 3,430,609) and the use of indicating lamps in conjunction with telephone line testing equipment (Semon U.S. Pat. No. 3,350,515).

SUMMARY OF THE DISCLOSURE

The prior art does not, however, disclose the use of an artificial line bridge and telephone built into a single unit to add to the central office equipment for testing said equipment under simulated operating conditions. These and other disadvantages of the prior art are solved by the instant invention wherein an integral unit having an artificial line and telephone built into one unit is provided, for addition to central office equipment to test said equipment under simulated operating conditions. The artificial line bridge unit of applicant's circuit provides means for dialing in or out and may be used to test the operability of working dial long line circuits as well as the ability of central office equipment to supply sufficient ringing current.

DETAILED DESCRIPTION OF THE DISCLOSURE

Applicant's invention relates to test equipment for testing any type of dial long line equipment used in telephone systems. It is intended that the testing of such dial long line equipment occur prior to its placement into subscriber service. The circuit is also designed to test dial long line equipment connected to a subscriber's line, without interfering with the subscriber.

Dial long line equipment such as a "booster" or "repeater" is often connected to telephone lines to compensate for line resistance. Applicant makes use of an artificial line bridge and telephone comprising a single unit which is added to the central office equipment for testing dial long line equipment under simulated operating conditions.

Figure 1:
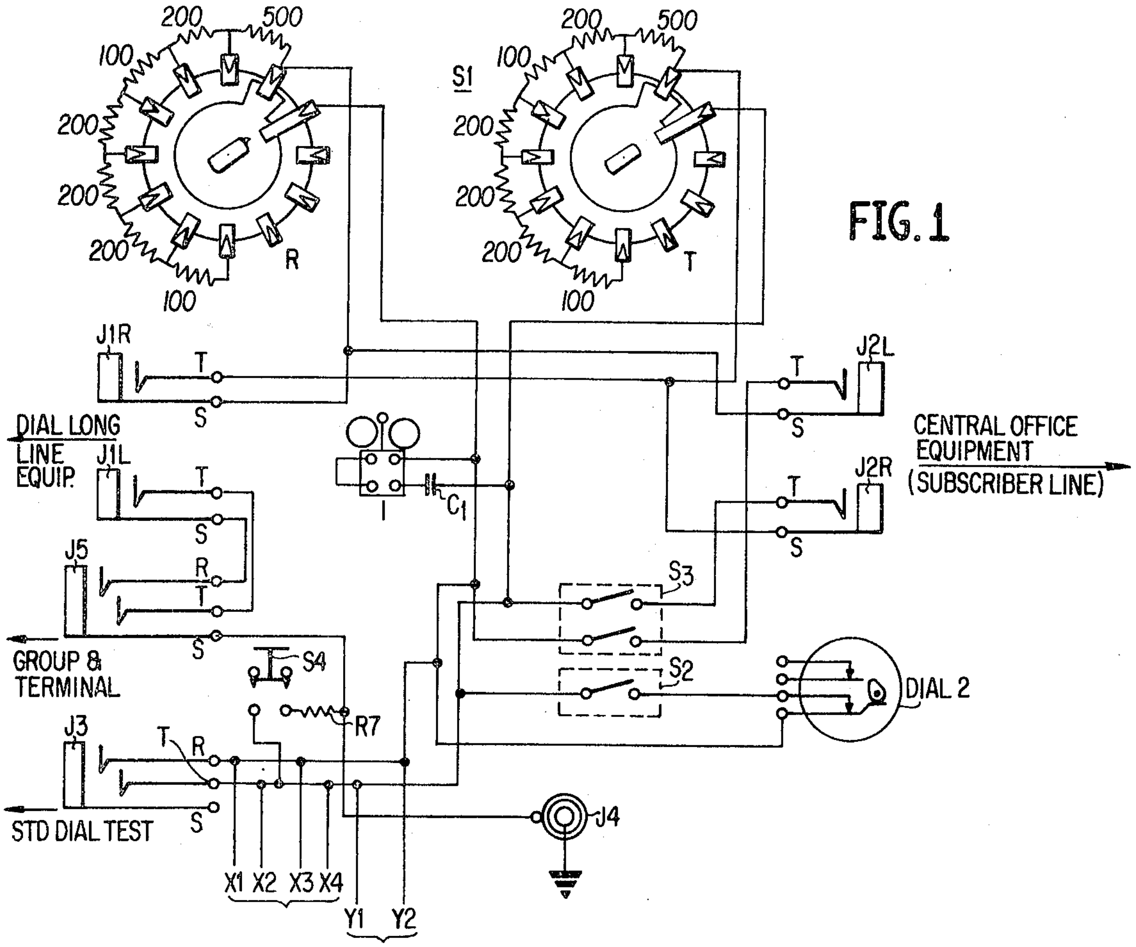
FIG. 1 is an electrical schematic diagram of the circuit of applicant's Artificial Line Bridge Subscriber Dial Long Line Equipment Tester.
Figure 2:
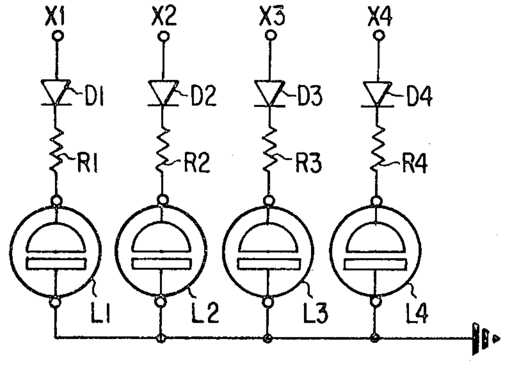
FIG. 2 is an electrical schematic diagram of a circuit that may be utilized in conjunction with the circuit of FIG. 1 to determine polarity of applied ringing currents.
Figure 3:
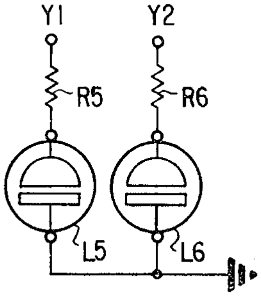
FIG. 3 is an electrical schematic diagram of another circuit that may be utilized in conjunction with the circuit of FIG. 1 to determine the polarity of applied ringing currents.

The circuit according to applicant's invention is shown in FIGS. 1, 2 and 3 of the drawings. FIG. 1 includes resistance bridge S1 which comprises a rotary switch connected in double pole manner having eleven different positions, with seven resistors shown connected between adjacent switch positions. The T-pole portion of switch S1 is the tip side of the line and the R-pole portion is the ring side of the line. The resistance bridge arrangement of switch S1 divides the resistance equally on either side of the line to balance tip and ring, similarly to the operation of a cable pair. The artificial building-out of the telephone line using the artificial line bridge of applicant's invention simulates the operation of an actual cable pair and enables the testing of telephone equipment for determining whether or not it is suitable for service.

The resistance values shown for resistors connected between adjacent switch positions are typical. However, applicant's invention is not limited to these values and it should be understood that switch positions having no resistors connected therebetween may be used to accommodate other resistors to provide desired resistance values when artificially building-out a line.

FIG. 1 also shows ringer 1 for incoming calls. Recordation of the ringing current of incoming calls may be provided by the neon lamp circuits shown in FIGS. 2 and 3. FIG. 2 illustrates neon lamps L1 through L4, each having a series connected diode and resistor connected to its cathode element, with its anode element being connected to ground. If the circuit of FIG. 2 is connected in the circuit of FIG. 1 by connection of complementary terminals X1 through X4, ringer 1 will ring on all incoming calls or codes and the neon lamp circuit L1 through L4 will identify the polarity of the ringing current as: –1 Ring, –2 Ring, –1 Tip, –2 Tip, +1 Ring, +2 Ring, +1 Tip and +2 Tip. Each neon lamp circuit having the described series connection of a diode and resistor will thereby be connected in series with the ringer circuit to tip or ring. For example, with respect to an eight-party line or a four-party line the following relationships are available:

| PARTIES | 1 | 2 | 3 | 4 | 5 | 6 | 7 | 8 |
|---|---|---|---|---|---|---|---|---|
| POLARITY | –R | –T | +R | +T | –R | –T | +R | +T |

| PARTIES | 1 & 2 | 3 & 4 | 5 & 6 | 7 & 8 |
|---|---|---|---|---|
| POLARITY | –1 Ring | +1 Ring | –2 Rings | +2 Rings |

The neon lamp circuit of FIG. 3 may be connected to FIG. 1 by connection of complementary terminals Y1 and Y2 and consists of two neon lamps L5 and L6 having associated series connected resistors and no diodes. The circuit of FIG. 3 will thereby only identify Tip parties and Ring parties, non-polarized.

The artificial line bridge unit of applicant's invention provides means for dialing in or out. The structure of jack J3 is conventional in the art and a standard dial test set may be plugged into jack J3 to dial through bridge S1. Alternatively, switch S2 may be actuated to the closed position to use dial apparatus 2 with the artificial line bridge unit for testing purposes. Jacks J2L and J2R are operative to test working dial long line circuits by connection thereof through a test lead to the cable pair of the working dial long line circuit under test. If switch S3 is then in the open position, and a ground cord is connected to jack J4, the circuits of FIGS. 2 or 3 are completed to ground. Ringer 1 will thus ring because it is connected across tip and ring.

If a resistance equal to the line resistance of the cable pair is provided by proper setting of switch S1, and a telephone is employed to dial the number associated with that cable pair, the ringing current will be supplied from the central office side of jacks J1L and J1R through resistance bridge S1 to the diode that will accept that particular ringing current (assuming that the circuit of FIG. 2 is connected to the circuit of FIG. 1). The corresponding neon lamp will be activated, ringer 1 will ring, and the polarity of the ringing current will be identified. This described connection will also test the central office equipment for its ability to supply a sufficient ringing current through the set resistance of resistance bridge S1.

In order to test free dial long line equipment, a lead is inserted into jacks J1L and J1R, with the other end of the lead being connected to the equipment under test. Another lead is connected to a group and terminal, with its end plug connected into jack J5. Another plug is used to connect a hand test set into jack J3, and operation of the talk key of the transmitter of the hand test set will put a short on the tip and ring through resistance bridge S1, through the jack J1R to the dial long line equipment, back through the jack J1L, and back out through jack J5 to the group and terminal, and the dial tone is thus heard. With the resistance bridge S1 and the dial long line circuit thus connected in series, a code ring is dialed to ring back into the artificial line bridge. This will test the components of the dial long line circuit to see if the latter is suitable for subscriber service.

Pushbutton switch S4 is connected as a substitute for a coin in testing coin box trunks and coin dial long line equipment. When activated to its operative position, it interposes fixed resistance R7 between ground and the tip side of the line to operate the coin trunk of the central office equipment.

A dummy plug can be made with the two tips shorted together and inserted into jacks J1L and J1R for testing other types of equipment when not using standard cords. Such a dummy plug will bridge the two sleeves (S) and the two tips (T) of jacks J1L and J1R, with jack J5 being used for other testing purposes. Other combinations of cord and plugs can be utilized in conjunction with the described jacks for other testing purposes without departing from the scope of the invention. The unit according to the invention comprises a housing with the jacks, switches and neon lamps mounted therein to provide an integral unit.

I claim:

1. A test apparatus for testing the signalling conditions of telephone subscriber circuits having cable pairs connected thereto, and which may be connected to dial long line equipment for offsetting losses caused by the resistance of the cable pairs, the telephone subscriber circuits being connected to a central office exchange, comprising:

a resistance bridge operative to provide an equally divided predetermined resistance to balance tip and ring in a selected telephone subscriber circuit to simulate the operation of an actual cable pair therein, a ringing means responsive to applied ringing signals to provide an audible indication thereof, visual indicating means responsive to applied ringing signals to provide an indication of the polarities thereof, a telephone dial device, first switch means selectively actuable to test dial long line circuits actually connected to telephone subscriber circuits by connecting the ringing means to a selected such dial long line circuit across tip and ring, causing the ringing circuit to ring if the selected dial long line circuit is operational, second switch means selectively actuable to connect the resistance bridge having a predetermined resistance equal to that of the cable pair of a selected telephone subscriber circuit to the central office through the telephone dial device, whereby said telephone dial device, when used to dial the number corresponding to the selected telephone subscriber circuit, causes a corresponding ringing signal to ring back from the central office through the resistance bridge to the ringing means and the visual indicating means to identify the polarity of the ringing current and determine if the central office equipment is supplying a sufficient ringing current for the selected telephone subscriber circuit, third switch means selectively actuable to cause a dial test set to establish a series connection between the resistance bridge and a selected free dial long line circuit, whereby a dial code from the dial test set will cause a ringing signal to ring back into the resistance bridge, and be applied to the ringing means, to provide an indication of the suitability of the selected free dial long line circuit for subscriber service.

2. In the test apparatus as recited in claim 1 wherein the resistance bridge, ringing means, visual indication means, telephone dial device, and first, second and third switch means are included within an integral housing unit.

3. In the test apparatus as recited in claim 1 further comprising: fourth switch means actuable to connect the test apparatus to coin box trunks and coin dial long line equipment, to enable testing thereof.

4. In the test apparatus as recited in claim 3 wherein the resistance bridge, ringing means, visual indication means, telephone dial device, and first, second, third, and fourth switch means are included within an integral housing unit.

* * * * *